United States Patent [19]

Boyesen

[11] Patent Number: 4,911,115
[45] Date of Patent: Mar. 27, 1990

[54] SLIDE EXHAUST CONTROL VALVE FOR FUEL INJECTED TWO-STROKE CYCLE ENGINES AND PROCESS FOR USING SAME

[75] Inventor: Eyvind Boyesen, Kempton, Pa.

[73] Assignee: Performance Industries, Inc., Kempton, Pa.

[21] Appl. No.: 351,651

[22] Filed: May 15, 1989

Related U.S. Application Data

[63] Continuation-in-part of Ser. No. 96,551, Sep. 15, 1987, Pat. No. 4,829,946.

[51] Int. Cl.⁴ .............................................. F02B 75/02
[52] U.S. Cl. ................................. 123/65 PE; 123/323
[58] Field of Search .............. 123/65 PE, 65 A, 65 V, 123/65 P, 323, 340

[56] References Cited

U.S. PATENT DOCUMENTS

| | | | |
|---|---|---|---|
| 1,514,476 | 11/1924 | Still .................................. | 123/65 PE |
| 4,121,552 | 10/1978 | Mithuo et al. .................. | 123/65 PE |
| 4,285,311 | 8/1981 | Iio .................................... | 123/323 |
| 4,321,893 | 3/1982 | Yamamoto ...................... | 123/65 PE |
| 4,325,335 | 4/1982 | Shibata ............................ | 123/323 |
| 4,364,346 | 12/1982 | Shiohara ......................... | 123/323 |
| 4,391,234 | 7/1983 | Holzleitner ..................... | 123/65 V |
| 4,399,788 | 8/1983 | Bostelmann .................... | 123/323 |
| 4,672,924 | 6/1987 | Hiasa et al. ..................... | 123/65 PE |
| 4,672,925 | 6/1987 | Miyata et al. ................... | 123/65 PE |

FOREIGN PATENT DOCUMENTS

| | | |
|---|---|---|
| 62-49445 | 10/1987 | Japan . |
| 62-243923 | 10/1987 | Japan . |
| 62-176437 | 11/1987 | Japan . |
| 62-267522 | 11/1987 | Japan . |
| 62-267523 | 11/1987 | Japan . |
| 62-271925 | 11/1987 | Japan . |
| 62-271926 | 11/1987 | Japan . |
| 62-271927 | 11/1987 | Japan . |
| 63-21319 | 1/1988 | Japan . |
| 63-38610 | 2/1988 | Japan . |
| 63-78132 | 5/1988 | Japan . |
| 63-30485 | 6/1988 | Japan . |
| 63-115530 | 7/1988 | Japan . |
| 63-192913 | 8/1988 | Japan . |
| 63-151936 | 10/1988 | Japan . |
| 63-248913 | 10/1988 | Japan . |
| 64-15425 | 1/1989 | Japan . |
| 64-19117 | 1/1989 | Japan . |
| 64-51730 | 3/1989 | Japan . |
| 64-83818 | 3/1989 | Japan . |

OTHER PUBLICATIONS

The High-Speed Two-Stroke Petrol Engine, Philip H. Smith, pp. 106-113, 125 published by Autobooks, Burbank, California, Feb. 1965.

*Primary Examiner*—David A. Okonsky
*Attorney, Agent, or Firm*—Ferrill and Logan

[57] ABSTRACT

A sliding exhaust control valve for two-stroke cycle engines is disclosed. This valve actuates at least partially through the exhaust passage and delays flow from the combustion chamber through the exhaust passage during the expansion stroke of the piston while permitting full opening of the exhaust passage and giving complete blow down before the scavenging cycle of the engine. Also disclosed is a mechanical linkage mechanism between the slide valve and the crankshaft and cam controlled actuation means to provide precise control of the exhaust valve throughout the engine cycle.

23 Claims, 3 Drawing Sheets

FIG. 3 3-3

SLIDE EXHAUST CONTROL VALVE FOR FUEL INJECTED TWO-STROKE CYCLE ENGINES AND PROCESS FOR USING SAME

This application is a continuation-in-part of my copending application Ser. No. 096,551, filed Sept. 15, 1987, and now U.S. Pat. No. 4,829,946.

BACKGROUND OF THE INVENTION

1. Field of the Invention

The present invention relates to new and useful improvements in two-stroke cycle gasoline engines and to new and useful improvements in exhaust valves for such engines. More particularly, the present invention provides a sliding exhaust valve which delays the opening of the exhaust port during the expansion stroke and, if desired, advances the closing of the exhaust port during the compression stroke while, at the same time, opening the exhaust port to permit proper blow down and allow scavenging of the combustion chamber.

2. Description of the Prior Art

It has been known in the past to provide speed-controlled exhaust valves which will remain partially closed at slow speeds of the engine, delaying communication between the combustion chamber and exhaust passage beyond the usual opening of the exhaust port by the piston, and move upward, fully exposing the exhaust passage to the combustion chamber through the exhaust port, at high engine speeds. Such valves, however, do not provide the advantages of longer expansion and compression strokes while also permitting maximum scavenging.

In the parent application, U.S. patent application Ser. No. 096,551, now allowed, a novel exhaust control valve is disclosed employing a linkage to the crankshaft which provides opening and closing of the exhaust passage during each cycle of the engine. This invention provides many distinct advantages, including an improved power stroke, more efficient and thorough combustion of fuel, and improved performance of downstream pollution control devices, such as catalytic converters, due to higher and more uniform exhaust temperatures. Although the invention of the parent application is believed to function quite well, applicant has found that further modifications to the basic concept are possible.

Accordingly, it is a primary object of the present invention to provide an exhaust control valve which provides an effective constriction of the exhaust passage when the valve is closed and provides minimal turbulent flow throughout its operation.

It is an additional object of the present invention to provide a sliding exhaust control valve drive mechanism which provides a direct and effective translation of the rotary motion of the crankshaft into the reciprocating motion of the valve element.

It is another object of the present invention to provide an exhaust control valve which is relatively simple in design, and provides reliable and straightforward operation, while avoiding short circuiting of combustible mixture.

SUMMARY OF THE INVENTION

A sliding exhaust control valve for two-stroke cycle engines is provided which reciprocates at least partially through the exhaust passage of the engine. The valve element, which in its preferred embodiment is essentially semi-cylindrical in cross-sectional shape, is interconnected with a cam follower. Cam means, which receives rotary motion from the engine crankshaft, actuates the cam follower and translates the rotary motion into back-and-forth reciprocating motion which moves the valve element between extended (i.e. "close") and retracted (i.e. "open") positions in timed relation to the piston movement to delay opening of the exhaust passage during the expansion stroke of the piston and advance closing of the exhaust passage during the compression stroke of the piston. After the exhaust passage is initially opened, the valve retracts towards its open position to allow the expulsion of the stream of exhaust gases passing through the exhaust port, so as not to interfere with scavenging of the combustion chamber.

The valve of the present invention provides improved scavenging of the combustion chamber, improved combustion of fuels with more thorough burning of hydrocarbons, less short circuiting of combustible mixture, a longer power stroke, and better operation of pollution control devices. Further, a cam controlled drive mechanism between the crankshaft and the slide valve is provided which readily translates the rotary motion of the crankshaft into the reciprocating motion of the valve element.

DESCRIPTION OF THE DRAWINGS

The operation of the present invention should become apparent from the following description when considered in conjunction with the accompanying drawings, in which:

FIG. 3 is a cross sectional view of the valve element of the present invention along line 3—3 of FIG. 2a;

DETAILED DESCRIPTION OF THE PREFERRED EMBODIMENT

Figure 1:
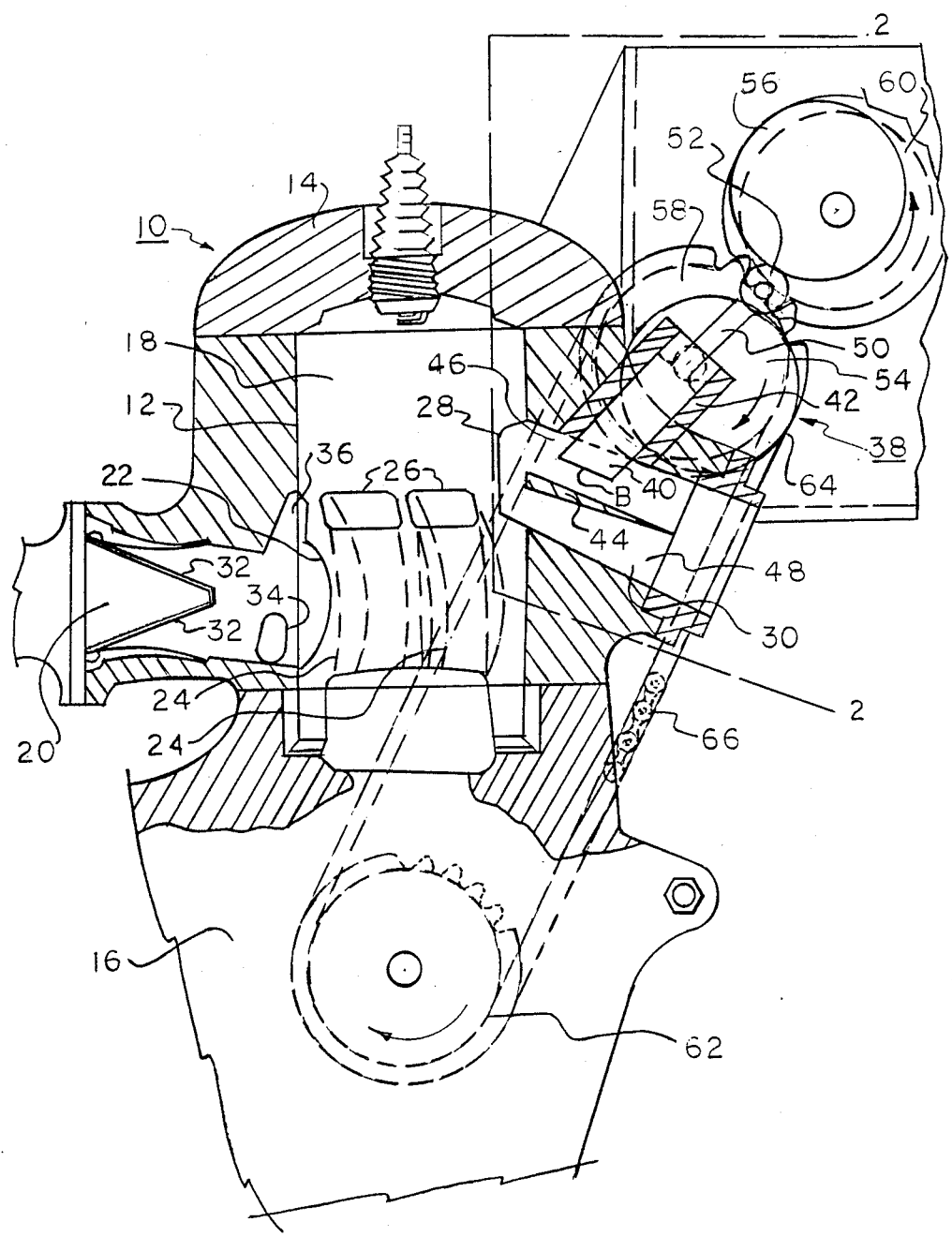
FIG. 1 is a longitudinal sectional view, partially in elevation, of a two-stroke cycle engine incorporating the present invention.

In the illustrated embodiment of the present invention, the exhaust control valve is shown in conjunction with a single cylinder fuel injected two-stroke cycle, variable speed, crankcase compression engine as used, for example, on motorcycles. However, the exhaust control valve of the present invention has many useful applications in other than the engine shown.

The engine 10 includes a cylinder 12, a cylinder head 14 and a crankcase housing 16, with a piston, connecting rod and crankshaft (not shown). The cylinder 12 includes a combustion chamber 18, an inlet or intake passage 20 terminating in the inlet port 22, transfer passages 24,24 terminating in transfer ports 26,26 and an exhaust port 28 leading to the exhaust passage 30. In the inlet passage 20 there are reed valves 32,32, a supplement transfer passage 34 and a booster port 36, similar to those described in my prior U.S. Pat. No. 3,905,341.

As is known, in this type of engine, the piston skirt, not shown, serves as the valve means for opening and closing the inlet port 22, booster port 36, transfer ports 26 and exhaust port 28. In the conventional engine of this type, as the piston is moving toward its bottom dead center position, the upper edge of the piston starts to open the exhaust port 28 at about the 90° position of the crankshaft, 0° being the crankshaft position at top dead center and 180° being the crankshaft position at bottom dead center. Upon continued further downward movement of the piston, the transfer ports 26 and booster port 36 start to open at approximately the 120° position of the crankshaft. When the piston reaches bottom dead center, all of these above ports are fully uncovered or open. Conversely, on the compression stroke of the piston, the transfer ports 26 and booster ports 36 are closed by the piston at about the 240° position of the crankshaft and the exhaust port 28 is closed by the piston at the 270° position of the crankshaft. Thus, in the conventional engine of this type, the effective expansion stroke of the piston and the effective compression stroke of the piston each occur during only a 90° rotation of the crankshaft.

Figure 2A:
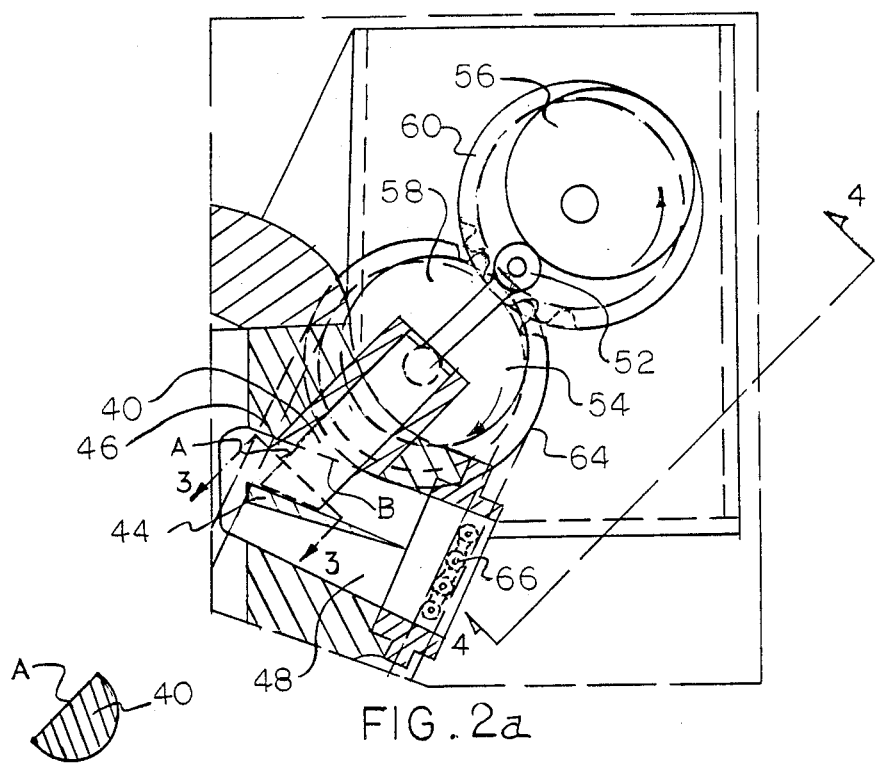
FIG. 2a is an enlarged sectional view of the portion of FIG. 1 designated 2—2, with the valve element of the present invention shown in both a fully retracted or open position (in solid) and a fully extended or close position (in phantom), and showing the cam means and the drive chain connection to the crankshaft.

In accordance with the present invention, valve means 38 are provided to delay fluid flow from the combustion chamber 18 through the exhaust passage 30 during the expansion stroke until after the piston has initially uncovered the upper edge of the exhaust port 28, but permit such fluid communication prior to, or simultaneously with, the transfer ports 26 being opened. Similarly, this same valve means 38 can shut off fluid communication through the exhaust passage 30 prior to the piston closing of the exhaust port 28. This increases the effective length of the expansion and compression strokes, thereby increasing the power output of the engine As is shown in FIGS. 1, 2a, and 3, the valve means 38 of the present invention comprises a semi-cylindrical valve element or member 40, having its substantially flat side A facing upstream, toward the exhaust port 28. Without departing from the present invention, other valve element 40 shapes may be employed, including rectangular, cylindrical, or planar. The valve member 40 reciprocates within, and is channeled by, a corresponding track 42 within the portion of the engine 10 which defines the exhaust passage 30. As is shown in FIGS. 1 and 2a, the lower face of the valve element 40 should be angled on its lower face B so that it withdraws completely from the exhaust passage 30 when the valve is fully retracted to allow unobstructed flow through the exhaust passage 30.

In the embodiment of the present invention shown in FIGS. 1 and 2a, a vane 44 is provided across the exhaust passage 30 which divides the exhaust port 28 and the exhaust passage 30 into an upper portion 46 and a lower portion 48. The vane 44 is positioned so that its lower edge is approximately level with the top of the transfer ports 26 and the booster port 36. In this embodiment, the valve element 40 in its fully extended position actuates to meet the vane 44 and essentially seal all flow through the upper portion 46 of the exhaust passage 30.

The slide valve member 40 may be driven in any manner which will translate the rotary motion of the crankshaft of the engine 10 into the reciprocating action of the valve 40. One such mechanism is a linkage system similar to that disclosed in my U.S. patent application Ser. No. 096,551, now allowed. However, the preferred form of valve drive for the present invention is described below.

Figure 5:
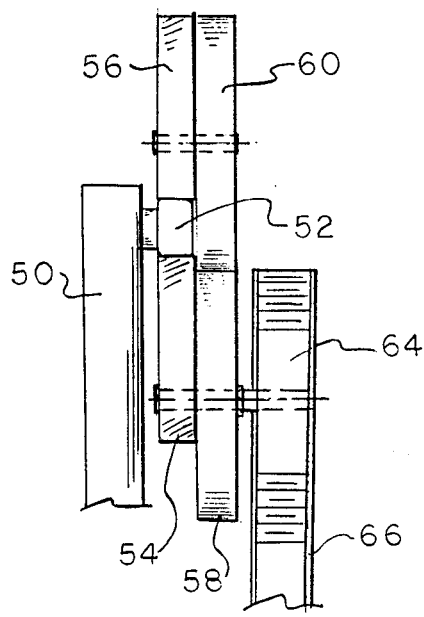
FIG. 5 is an back elevational view of the cam means along line 4—4 of FIG. 2a, including the cam elements, the cam follower, and the sprocket connection to the drive chain.

As is shown in FIGS. 1, 2a, and 5, attached to, or integral with, the valve member 40 is a rod 50 which has a rotatable cam follower 52 attached to its distal end. The cam follower 52 is positioned between a first cam element 54 and a second cam element 56. The two cams 54 and 56, which are mirror images of each other, should be linked to rotate in a one-to-one relation with each other. This is accomplished in the preferred embodiment by attaching cam 54 to drive gear 58 and cam 56 to driven gear 60, the two gears 58 and 60 being of identical size and oriented in driven relation to each other.

The purpose of employing a second cam element 56 is to assure that the cam follower 52 remains in constant contact with the first cam element 54 throughout the cycle of the valve element 40. Although not preferred, a spring or similar means may be employed to maintain cam follower 52 contact and avoid need for a the second cam element 56. However, this latter embodiment may not be able to maintain cam and cam follower contact at high engine speeds.

The cams 54 and 56 may then be actuated by a direct mechanical link to the crankshaft. As shown, a sprocket 62 is provided on the crankshaft, an identical sprocket 64 is attached to the first cam 54, and a drive chain 66 is attached between the two sprockets 62 and 64 to drive them in one-to-one relationship with each other.

As so arranged, in operation each revolution of the crankshaft produces one revolution of the cams 54 and 56 and, as a result of the corresponding movement of the cam follower 52, one reciprocation of the valve element 40. It should be appreciated that various cam shapes may be employed to fine-tune the valve member 40 movement for each engine or each use of an engine. In this manner, the movement of the valve element 40 of the present invention may be altered and adjusted by simply changing cams. Additionally, it may be possible in some applications to substitute electronic "cams" which receive electronic signals from the crankshaft and drives a synchronous motor which controls movement of the valve element 40.

In the position as shown in FIG. 1, the slide valve 40 is approximately midway between the top of the exhaust passage 30 and the vain element 44, and upon rotation of the crankshaft, will extend to close completely the upper portion 46 of the exhaust passage 30. In the illustrated position, the upper edge of the upward moving piston has just closed the transfer ports 26 and is beginning to compress the gases in the combustion chamber 18. When the slide valve member 40 continues its outward extension enough to close the upper portion 46 of the exhaust passage 30, as is shown in phantom in FIG. 2a, a seal will be provided which prevents the compressing gases in the combustion chamber from entering the exhaust passage 30, thus avoiding the loss of unburned fuel.

In the downward cycle of the piston, the exhaust passage 30 remains blocked, preventing the expanding gases in the combustion chamber 18 from entering the exhaust passage 30. With this arrangement, the effective expansion force on the piston is extended from 90° rotation of the crankshaft to approximately 105° to 120°-125° rotation of the crankshaft. This increases the length of the power stroke of the piston by more than twenty percent. Through use of the vane 44 and slide valve 40 of the present invention, an effective seal is possible regardless of whether the valve 40 is placed at the exhaust port 28 itself or further downstream in the exhaust passage 30, as shown.

Figure 2B:
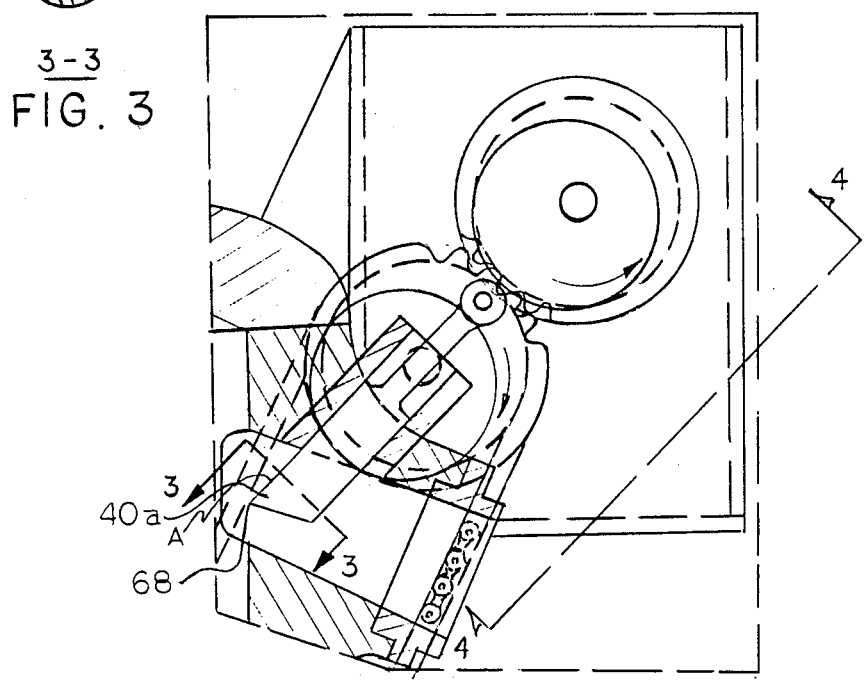
FIG. 2b is an enlarged sectional view of the portion of FIG. 1 designated 2—2, showing another embodiment of the present invention without a vane element in the exhaust passage, and with the valve element of the present invention in a fully extended or close position.

Another embodiment of the present invention is shown in FIG. 2b. In this embodiment, the vane is eliminated and the valve member 40a extends further into the exhaust passage to or below the level of the top of the transfer ports 26. Ideally, the valve member 40 in this embodiment should seal against the piston, as shown, or should extend to abut the opposite wall of the exhaust passage 30—so as to create a complete seal of the exhaust passage 30. In the embodiment shown, the leading edge 68 of the valve member 40 is contoured to match the curvature of the piston and cylinder 12 in order to improve the seal of the exhaust passage when the valve member is fully extended. However, in either form the benefits of the present invention may still be achieved even without a thorough exhaust passage 30 seal.

Without departing from the spirit of the present invention, it should be noted that at high engine speeds, it may be necessary to advance opening of the exhaust passage to allow adequate time for scavenging. One such method of advancing opening of the exhaust passage is shown my U.S. patent application Ser. No. 096,551, now allowed. Further, the present invention may be employed with all forms of fuel delivery systems, including those using conventional carburetors, fuel injectors, blower scavenging or supercharging, and those with various forms of reed valves.

Figure 4:
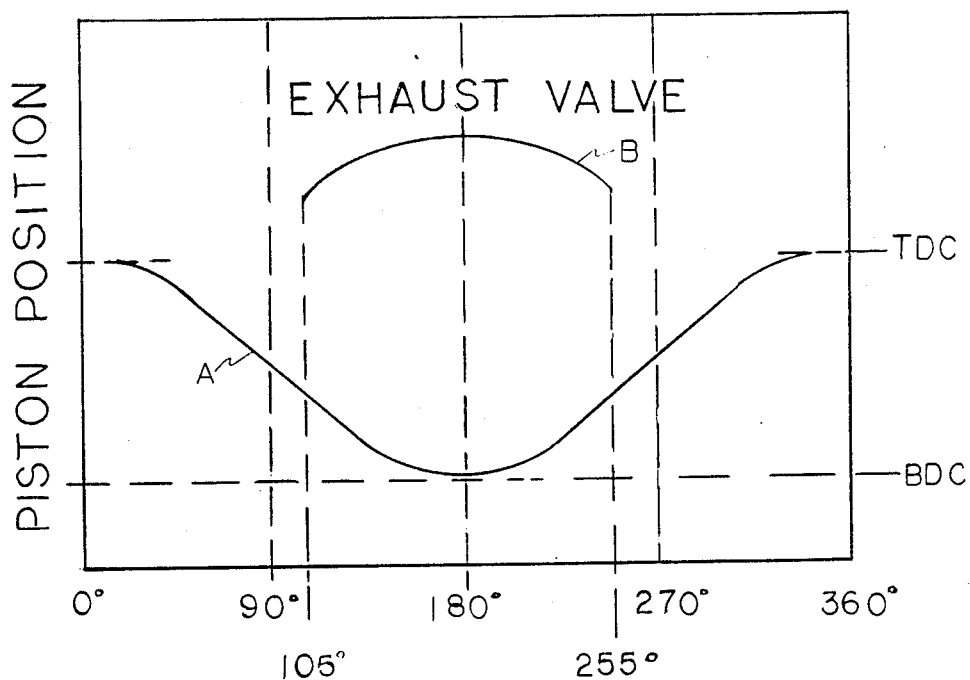
FIG. 4 is a chart showing piston position and exhaust valve position relative to crankshaft rotation.

The chart of FIG. 4 illustrates with graph A a plot of piston position versus crank angle. Graph B is a plot of the movement of the slide valve 38 during the time the exhaust passage 30 is open to the combustion chamber 18 in the illustrated embodiment of the present invention. While the plot of graph B shows the exhaust passage being opened at 105° of crank angle and closed at 255° of crank angle, there is flexiblity in the design, and the slide valve 38 may be designed to open the exhaust passage 30 anywhere between a 90° and 120° crank angle and close anywhere up to a 270° crank angle.

It should be appreciated that the optimal point of opening or closing the exhaust valve depends in large part on many factors peculiar to individual engine design. These include: the type of charge to the engine, the size of the engine, the scavenging flow, and the configuration and shape of the engine. Additionally, it is believed that it may be desirable to adjust the degree of valve movement with engine speed and throttle opening, with the valve remaining substantially closed at low speeds and closed throttle and providing full movement at high speeds and wide open throttle. This may be accomplished in any suitable manner, which may include another mechanism in the linkage between the crankshaft and the valve member which controls the extent of valve movement in accordance with engine speed and throttle opening, or by switching electronic cams, as discussed, during operation.

While particular embodiments of the present invention have been illustrated and described herein, it should be apparent that changes and modifications may be incorporated and embodied therein within the scope of the following claims.

What is claimed is:

1. In a two-stroke cycle internal combustion engine having an air intake passage, an exhaust port leading to an exhaust passage, a piston reciprocating in continuous cycles between top and bottom dead center positions in a cylinder, said piston being interconnected with a rotatable crankshaft, at least one transfer passage providing compressed air to a combustion chamber above the piston, and valve means within the exhaust passage adapted to control flow through the exhaust passage, the improvement in said valve means comprising
   a slide valve member which actuates at least partially through said exhaust passage;
   actuating means for said valve member to move said valve member between an extended position closest to said cylinder and a retracted position; and
   said actuating means being in timed relation with said crankshaft rotation and piston movement to move said valve member from said extended position toward said retracted position after the upper edge of said piston passes downward below the upper edge of the exhaust port, and to move said valve member from said retracted position toward said extended position when said piston is near its bottom dead center position.

2. The apparatus of claim 1 wherein said actuating means comprises a mechanical linkage between said valve member and said crankshaft which produces one cycle of extension and retraction of the valve member for each cycle of said crankshaft.

3. The apparatus of claim 2 wherein said mechanical linkage includes cam means actuating said valve member and drive means between the crankshaft and the cam means.

4. The apparatus of claim 3 wherein the cam means comprises at least one cam, a corresponding cam follower attached to and moving said valve member, and means to maintain contact between said cam and said cam follower.

5. The apparatus of claim 4 wherein the means to maintain contact between said cam and said cam follower comprises a second cam which is mechanically linked to, and operates in the opposite direction of, the first cam, and wherein the cam follower is positioned between the two cams and remains in contact with both cams throughout the cycle of the valve member.

6. The apparatus of claim 3 wherein the drive means comprises a mechanical linkage between the cam means and the crankshaft.

7. The apparatus of claim 6 wherein the mechanical linkage comprises sprocket means attached to the crankshaft, sprocket means attached to the cam means, and a drive means between each of the sprocket means.

8. The apparatus of claim 1 wherein the valve member moves within channeling means when actuating between the extended and the retracted positions.

9. The apparatus of claim 8 wherein the valve member comprises a substantially semi-cylindrical valve element and said channeling means comprises a corresponding semi-cylindrical track in which said valve element reciprocates.

10. The apparatus of claim 9 wherein the valve element assumes a position substantially flush with the exhaust passage when it is in its fully retracted position, presenting a substantially uniform passageway for the flow of exhaust gases.

11. The apparatus of claim 1 wherein said valve member is moved from said retracted position toward said extended position after the piston reaches its bottom dead center position.

12. The apparatus of claim 1 wherein the valve member actuates in its fully extended position only partially across the exhaust passage.

13. The apparatus of claim 12 wherein vain means are provided within the exhaust passage and the valve member extends to meet the vain means in its fully extended position.

14. In a two-stroke cycle internal combustion engine including a cylinder, a combustion chamber in the cylinder, an exhaust port spaced from and below the upper end of the combustion chamber leading to an exhaust passage, and a piston carried within said combustion chamber for reciprocation between top and bottom dead center positions, said piston being interconnected with a rotatable crankshaft and functioning as a valve member to open and close said exhaust port, and valve means within the exhaust passage adapted to control flow through the exhaust passage, the improvement comprising said valve means comprising a slide valve element which actuates at least partially through said exhaust passage;

actuating means for said valve element to move said valve element between an extended position, restricting fluid flow through said exhaust passage, and a retracted position, providing free fluid flow through said exhaust passage; and said actuating means being in timed relation with said crankshaft rotation and piston movement to move said valve element from an extended position toward a retracted position as the piston passes downward, and to move said valve element from the retracted position toward the extended position when said piston is near its bottom dead center position.

15. The apparatus of claim 14 wherein said actuating means comprises a mechanical linkage between said valve member and said crankshaft which produces one cycle of extension and retraction of the valve member for each cycle of said crankshaft.

16. The apparatus of claim 15 wherein said mechanical linkage includes cam means which actuates said valve member and comprises at least one cam, a corresponding cam follower attached to and moving said valve member, and means to maintain contact between said cam and said cam follower; and drive means between the crankshaft and the cam means.

17. The apparatus of claim 16 wherein the means to maintain contact between said cam and said cam follower comprises positioning the cam follower between the cam and a second cam, the second cam operating in conjunction with the first cam to maintain the cam follower in contact with both cams throughout the cycle of the valve member.

18. The apparatus of claim 16 wherein the drive means comprises a mechanical linkage between the cam means and the crankshaft.

19. The apparatus of claim 14 wherein the valve member is oriented within channeling means integral with the portion of the engine defining the exhaust passage, the channeling means assisting in guiding the valve member in its path of reciprocation between the extended and the retracted positions.

20. The apparatus of claim 19 wherein the valve element assumes a position substantially flush with the exhaust passage when it is in the fully retracted position, presenting a substantially uniform passageway for the flow of exhaust gases.

21. The apparatus of claim 14 wherein said valve member is moved from said retracted position toward said extended position after said piston reaches its bottom dead center position.

22. The apparatus of claim 14 wherein the valve member actuates in its fully extended position only partially through the exhaust passage.

23. The apparatus of claim 14 wherein at least a portion of the exhaust passage is divided by vain means and, in its fully extended position, the valve member extends to meet the vain means.

* * * * *

UNITED STATES PATENT AND TRADEMARK OFFICE
CERTIFICATE OF CORRECTION

PATENT NO. :  4,911,115
DATED      :  March 27, 1990
INVENTOR(S):  Eyvind Boyesen It is certified that error appears in the above-identified patent and that said Letters Patent is hereby corrected as shown below:

Col. 4, line 52 - "vain" should be --vane--

Col. 7, line 6  - "vain" should be --vane--

Col. 7, line 8  - "vain" should be --vane--

Col. 8, line 39 - "vain" should be --vane--

Col. 8, line 41 - "vain" should be --vane--

Signed and Sealed this

Fourteenth Day of May, 1991

Attest:

HARRY F. MANBECK, JR.

*Attesting Officer*    Commissioner of Patents and Trademarks